United States Patent [19]
Duncan, Jr.

[11] Patent Number: 5,559,085
[45] Date of Patent: Sep. 24, 1996

[54] ORGANIC LIQUID BASE DRILLING FLUID WITH TERPENE

[75] Inventor: William M. Duncan, Jr., Corpus Christi, Tex.

[73] Assignee: Integrity Industries, Inc., Kingsville, Tex.

[21] Appl. No.: 243,764

[22] Filed: May 17, 1994

Related U.S. Application Data

[63] Continuation-in-part of Ser. No. 200,677, Feb. 23, 1994, and a continuation-in-part of Ser. No. 142,953, Oct. 29, 1993, abandoned, which is a continuation of Ser. No. 950,491, Sep. 25, 1992, abandoned.

[51] Int. Cl.$^6$ ........................................... C09K 7/00
[52] U.S. Cl. ..................... 507/103; 507/136; 507/137; 507/138
[58] Field of Search ............................ 507/103, 905, 507/136, 137, 138

[56] References Cited

U.S. PATENT DOCUMENTS

| | | | |
|---|---|---|---|
| 2,604,448 | 7/1952 | Wilson | 507/103 |
| 4,409,108 | 10/1983 | Carney et al. | 507/103 |
| 4,704,225 | 11/1987 | Stoufer | 252/153 |
| 5,010,109 | 4/1991 | Inoi | 514/714 |

*Primary Examiner*—Philip Tucker
*Attorney, Agent, or Firm*—G. Turner Moller

[57] ABSTRACT

A drilling fluid comprises a continuous phase of diesel oil, mineral oil, ester, mono-ether, di-ether, poly-alpha-olefin, detergent alkylate, terpene and mixtures thereof. Water is added to make an inverted emulsion. In the non-terpene based drilling fluids, terpene or terpenes is added in the amount of 1–80% by volume to increase the penetration rate and provide other advantages, such as rapid biodegradability. The terpene may be of the unsaturated type or the saturated type.

15 Claims, No Drawings

ORGANIC LIQUID BASE DRILLING FLUID WITH TERPENE

This application is a continuation-in-part of (1) application Ser. No. 08/142,953, filed Oct. 29, 1993, now abandoned, which is a continuation of application Ser. No. 07/950,491, filed Sep. 25, 1992, now abandoned and (2) copending application Ser. No. 08/200,677, filed Feb. 23, 1994, now allowed.

This invention relates to a drilling fluid and a drilling fluid additive.

Drilling fluids used to drill wells into the earth are commonly called drilling muds because the original drilling fluid was simply water that mixed with clays in the earth to produce a thin mud. Typically, drilling mud is pumped down the drill string, through nozzles in the end of the bit and then upwardly in the annulus between the drill string and the wall of the bore hole. Drilling mud has a variety of functions and must accordingly have comparable capabilities. Cuttings generated by the bit are moved away from the bottom of the hole and then upwardly through the annulus to the surface to present a clean rock face to be drilled. The bit is cooled and lubricated by the drilling mud. The pressure of fluids in the formations penetrated by the bit is substantially counterbalanced by the hydrostatic weight of the mud column in the hole. The drilling mud is modified to prevent undue effects on the bore hole wall, e.g. shale swelling. In water based and in inverted emulsion muds, materials are added to prevent undue water loss into permeable formations penetrated by the bit. Various materials are added to reduce friction between the drill string and the bore hole wall. Those skilled in the art realize an almost endless list of substances have been added to drilling mud for a variety of reasons.

Oil based drilling fluids were developed about 70 years ago and eventually became popular as they improved because of exceptional borehole stability, temperature stability, rapid rate of penetration, high lubricity causing reduced pipe sticking tendencies and a reduced tendency to damage productive formations. Different locales have different problems so oil based muds are widely used in response to which problems appear paramount.

The original oil based muds were made with crude oil and contained very little or no water. These muds may have contained viscosifiers, weight materials and fluid loss reducers. As oil mud chemistry evolved, diesel and mineral oil replaced crude oil as the continuous phase of the drilling fluid. Water was added in larger and larger quantities, along with emulsifiers, to create modern inverted oil emulsions known as invert oil muds in which water is the discontinuous or internal phase and oil is the continuous or external phase. Modern invert oil muds are generally considered the best all around drilling fluids and are the most widely used drilling fluids for deep drilling, i.e. below 10,000', on land. An extensive summary of oil based drilling fluids is found in a training publication of Hughes Drilling Fluids entitled History of Oil Muds.

Unfortunately, oil based muds are environmentally troublesome because the cuttings are oil wet and spent drilling fluid from a well may be of substantial volume. Thus, oil based muds have justifiably fallen under serious regulatory scrutiny. The day is long since gone when the oil wet cuttings from an onshore well are simply buried at the well site and reserve pit contents simply spread in a pasture.

The problem posed by oil based muds is worse offshore. Even low toxicity mineral oil muds are being limited in use due to slow biodegradability. At the present, oily cuttings from offshore wells are disposed of by shipment to shore for treatment in a disposal facility, injection into the annulus of the well bore or treatment to remove oil before discharging over the side. As will be apparent, all of these methods have substantial costs.

Some recent developments involve so-called synthetic based muds. As contrasted to the diesel or mineral oil in conventional oil based muds, synthetic based muds use manufactured organic compounds that act like an oil but are more readily biodegradable. Muds made with these fluids are typically inverted emulsions with 5–40% water emulsified in them. There are several examples of the continuous phase in these synthetic muds:

(a) an ester, which are synthetic oil soluble liquids made by the reaction of a fatty acid with an alcohol;

(b) a mono-ether, di-ether or mixture made by condensation and partial oxidation of alcohols;

(c) poly-alpha-olefins which are straight chain non-aromatic hydrocarbons normally made by polymerization of ethylene;

(d) detergent alkylate which is also called a linear alkyl benzene, which is benzene to which a saturated hydrocarbon has been attached.

These materials are discussed at length in an article, incorporated herein by reference, entitled Physicochemical Properties of Synthetic Drilling Fluids, Society of Petroleum Engineers, pp 181–184, presented at the 1994 IADC/SPE Drilling Conference held in Dallas, Tex., Feb. 15–18, 1994. These materials are not strictly oils but they are oil soluble and normally highly lubricious and have many of the characteristics of oils. As will be apparent, this invention is used in oil base muds (OBM's) and muds having these synthetic bases (SBM's).

In general, the most common drilling fluids presently used are water based muds and diesel based oil muds on land and water based muds and synthetic based muds offshore. Low toxicity, low aromatic and non-aromatic mineral oil based muds are still being used on land and offshore.

The performance characteristics of these oil based and synthetic based drilling fluid systems vary and are dependent on many variables. Selection and tweaking of a mud system for a particular well is always a tradeoff of all costs against expected or hoped for performance. It is not uncommon to heavily treat these systems with emulsifiers and temperature stabilizers when drilling in deep, hot, hostile environments. A large disadvantage of substantial chemical treatment of OBM's and SBM's is often a reduction in the rate of penetration. Thus, a good deal of effort is used to provide the minimum necessary chemical treatment to minimize costs and minimize the reduction in the rate of penetration. Slower drilling means inevitability higher costs, particularly offshore where costs are substantially higher than onshore.

It is known in the art to use a terpene or terpene blend in a water based mud system to enhance the rate of penetration, improve mud properties and stabilize the well bore as shown in copending application Ser. No. 08/142,953, filed Oct. 29, 1993, now abandoned, which is a continuation of application Ser. No. 07/950,491, filed Sep. 25, 1992, now abandoned. It must be admitted that the mechanism which increases penetration rate is unknown. Initial conclusions made a year ago about the mechanism have proved incomplete. It is also known to place a small amount of d-limonene, a well known terpene, in drilling mud as a fragrant as shown in U.S. Pat. No. 4,409,108.

When it was first proposed to add a terpene or terpene blend to an OBM or SBM, the uniform conclusion of those skilled in the art was that it would not work. One reason is that terpenes added to conventional water based muds were thought to increase penetration rate because the terpenes clean the bit better and provide better lubricity. These are strengths rather than weaknesses of OBM's and SBM's and it was not thought that terpenes would provide an improvement.

In a test well in Zapata County, Tex. drilling in the middle of a hard tough shale section below protection pipe using a conventional inverted emulsion diesel oil based drilling fluid, a slug or batch of a blend of saturated and unsaturated terpenes was added through the inlet of the mud pump. This situation is the subject of Example 1. The slug was pumped for a predetermined time at a rate to provide approximately 10% terpene in the mud being used. The time for the slug to reach the bit was calculated. Before the slug arrived at the bit, the formation was drilling about 30'/hour. At about the time the slug should have arrived at the bit, penetration stopped for about one minute and then restarted at a much faster rate and fluctuated between 49'/hour and 81'/hour. Drilling continued at this fluctuating rate for a time and then settled back to 30'/hour. When enough time had elapsed for the terpene to reach the surface, a large quantity of very fine cuttings suddenly appeared at the flowline leading to the mud tank. The batch of terpene containing mud circulated through the mud tank, was necessarily diluted and ultimately was again delivered through the drill string to the bit. Later, there was an unexplained, but more moderate, increase in penetration rate which is now believe to have been at least partially caused by the terpene slug, now diffused or diluted, reaching the bit. Later, as a control, diesel was injected at 10% by volume. There was no apparent effect on the penetration rate when the diesel slug passed through the bit.

Several conclusions were made from this test. First, there was no doubt the terpene slug increased penetration rate substantially. There was no other explanation for the sudden increase at about the time the slug arrived at the bit. When the drilling rate stayed high for a while and then settled back to the initial rate, the conclusion was that the terpene slug had entirely passed through the bit and was headed up the annulus. Second, the terpene slug caused the well to unload the large quantity of very fine cuttings. There has been no convincing explanation of this phenomenon nor is it known whether this is causally related to the increase in penetration rate or whether this is a concurrent result of whatever increases penetration rate.

Terpenes are added in various quantity to a drilling fluid for a variety of purposes. Relatively small quantities, e.g. 1–15% increase the drilling rate of oil based and synthetic based drilling muds. Very large quantities, e.g. 50–80% are used when the terpene is the continuous phase of an emulsified drilling fluid. Intermediate quantities, e.g. 10–60%, are used when the continuous phase of the drilling fluid is a mixture of terpene and an organic liquid in which continuous phase has properties that are dependent on the ratio of terpene and organic liquid. Thus, it is proposed that terpenes may be used in drilling fluids in widely ranging amounts, depending on the situation and intended purpose of the terpene.

It is an object of this invention to provide improved OBM's and SBM's that provide greater penetration rates.

Another object of this invention is to provide a terpene or terpene blend in an OBM or SBM that provides greater penetration rate.

A further object of this invention is to provide a terpene or terpene blend in a synthetic based mud that will pass current toxicity tests and retain the high penetration rates and other advantages of terpene type mud systems.

Another object of this invention is to provide a drilling mud in which a terpene is the continuous phase.

A further object of this invention is to provide an emulsified drilling fluid in which the continuous or external phase includes a large proportion of terpene.

These and other objects of this invention will become more fully apparent as this description proceeds.

The drilling fluid of this invention comprises an organic liquid as the continuous or external phase. As used herein, organic liquids are materials that are liquid at atmospheric temperature and pressure and comprise a carbon chain. The continuous phase may be an oil base, a synthetic base, a terpene base or a mixture thereof. The continuous phase of oil based drilling fluids may include high gravity crude oil but it is normally a refined product such as diesel oil or mineral oil. The continuous phase of synthetic based drilling fluids may comprise liquid ester, liquid mono-ether, liquid di-ether or mixtures thereof, liquid poly-alpha-olefins or detergent alkylates or mixtures thereof. In oil based or synthetic based drilling fluids, a quantity of terpene is added to increase the penetration rate and provide other advantages, such as low toxicity. In terpene based drilling fluids, the continuous phase provides the advantages of the terpene.

For use in environmentally sensitive areas, liquid ester, liquid mono-ether, liquid di-ether, liquid poly-alpha-olefins, detergent alkylates and terpenes are preferred. The oil, synthetic or terpene base material is mixed with water to provide an inverted emulsion in which the base is the continuous phase and water is the discontinuous phase.

In areas where environmental concerns are not acute, more economical materials are preferred for the continuous phase. Materials such as diesel oil are most common in these situations. Other refined petroleum products, such as mineral oil, are used in intermediate environmental areas and other situations.

There are many situations where the selection of a base material dictates the use of a mixture of terpene and another organic liquid. For example, low toxicity, low odor, rapid biodegradability, high penetration rates and low costs often seem to be mutually exclusive requirements so compromises are always made. One of these compromises is to incorporate a relative large quantity of terpene in the base material.

As a general rule, these drilling fluids include a viscosifier to make the liquid thick enough to carry cuttings, a water loss control material to reduce the loss of water in the drilling fluid to permeable formations encountered in the well, weight material for increasing the density of the drilling fluid and thereby increasing the hydrostatic weight of a column of the drilling fluid to control the pressures of the formations encountered, emulsifiers to maintain the emulsion of water in oil, and a variety of specialized additives such as wetting agents or other specialized materials.

The standard viscosifier used in OBM's or SBM's is specially treated organophillic bentonite which is often called oil mud gel. Other materials, such as a synthetic polymer, such as Alcomer 274, available from Allied Colloids, Inc. of Suffolk, Va. are also commonly used. Bentonite is a naturally occurring swellable clay and has been used for decades as the standard viscosifier in water based drilling muds. It can be treated to swell in oil as well as water. The purpose of raising the viscosity is to enable the drilling fluid to carry cuttings upwardly in the hole. Another advantageous side effect of bentonite as a viscosifier is that when the mud is quiescent, it forms a thick gel or semi-solid from which cuttings do not readily fall out.

There are many water loss control materials used or suggested for use in drilling fluids. Bentonite has a water loss control capability, to a point, because the swollen clay particles are swept onto the face of a permeable formation by escaping water to produce a soft, gummy filter cake which somewhat retards water loss into a permeable formation.

Powdered asphalt, gilsonite, specially treated lignite, and other materials have long been used as water loss control materials in oil based muds and are applicable to the OBM's or SBM's of this invention. When added in proper proportions to an oil or synthetic based mud system, the water loss to permeable formations can be reduced to quite small amounts.

The standard weight material used in drilling muds is powdered barite which is barium sulfate. Hematite or iron oxide is also used in some circumstances. Unweighted oil or synthetic based mud systems typically exhibit an initial density of about 8.0 pounds/gallon or less and thus have to contain weight material unless the well is being drilled underbalanced. After drilling for a while, the density rises because of retained drilled solids. To achieve mud densities above about 8.5 pounds/gallon, weight material is added.

In one aspect, the additive of this invention falls into a category of specialized materials that are added to oil or synthetic based drilling fluids for a variety of more subtle, but still important, reasons than those mentioned above. Terpenes are added to oil or synthetic based drilling fluids to increase penetration rate. Terpenes also reduce the surface tension of oil or synthetic based muds and this is believed to be either a cause of the increased penetration rates or a concurrent result of whatever is causing increased penetration rates. Thus, as a rough indicator, decreased surface tension of oil or synthetic based drilling fluids is believed to be related to increased penetration rates.

EXAMPLE 1

A Zapata County, Tex. well was drilling below protection pipe at 9400', a hard tough shale locally known as the Midway shale at a rate of 30'/hour. The drilling fluid being used was a conventional diesel oil based mud having the following characteristics: mud weight 15#/gallon, oil-water ratio 82/18, 33% solids, 55% oil and 12% water. A blend of saturated and unsaturated terpenes, specifically 54% pinane and 46% pinene, was injected for a predetermined time into the inlet of the mud pump at a volume necessary to create a slug of drilling mud comprising about 10% terpene. Injection of terpene was then stopped. When the terpene rich slug reached the bottom of the well bore, drilling stopped for about one minute and then immediately increased to a fluctuating rate between 49–81'/hour. Because there was no change in lithology, i.e. the character of the rock, the increase in penetration rate was attributed to the terpene additive. After drilling at this rapid rate for what was thought to be while the terpene rich slug was adjacent the bit, the penetration rate dropped back to 30 feet/hour. When the terpene rich slug reached the surface, a substantial quantity of very fine cuttings were unloaded from the well over the shale shaker. The terpene rich slug mixed in the mud tank with non-terpene mud and was pumped back into the drill string. A later period of increased drilling rate was noted at about the time the diluted terpene mud should have reached the bit. After the initial test on this well, terpene was added to the mud system at the depths shown in Table I with the reported results.

TABLE I

| Depth | Amount of Tervene Addition | ROP before slug arrived at bit ft/hour | ROP after slug arrived at bit ft/hour |
| --- | --- | --- | --- |
| 9,850' | 275 gallons | 30 | 60 |
| 10,510' | 275 gallons | 28.6 | 48 |
| 10,770' | 220 gallons | 22 | 62 |
| 11,120' | 220 gallons | 18 | 38 |
| 11,450' | 220 gallons | 26 | 45 |

The terpene in Table I was the same terpene blend as in the initial test and was injected into the mud pump inlet to produce a slug of about 10% terpene in the preexisting drilling fluid. As in the initial test, the penetration rate after the slug arrived at the bit stayed at the higher rate for a while and then settled back to the penetration rate before the slug arrived.

EXAMPLE 2

A sample of low toxicity mineral oil (Conoco LVT-200) was tested to measure the surface tension using a surface tension testing apparatus from Fisher Scientific Company. A 10% addition of pinane, a saturated terpene, was then added to the sample of LVT-200 and the surface tension measured again. The results indicated a 6% decrease in surface tension of the LVT-200 after addition of the pinane. Based on these results, an LVT-200 based oil mud with 10% pinane was formulated under laboratory conditions and tested for acceptability as a drilling fluid according standards and procedures of the American Petroleum Institute (API). The results of these tests indicated the fluid was acceptable for use as a drilling fluid and was likely to exhibit high performance.

EXAMPLE 3

The same LVT-200 base material and procedures in Example 2 were used except that 10% pinene, an unsaturated terpene, was substituted for the 10% pinane. The results were identical.

EXAMPLE 4

The same LVT-200 base material and procedures in Examples 2 and 3 were used except that a 10% terpene blend comprising 54% pinane and 46% pinene was substituted for the 10% pinane and 10% pinene. The results were identical.

EXAMPLE 5

A sample of ETHYLFLO 164, a poly-alpha-olefin (PAO) available from The Ethyl Corporation, Baton Rouge, La. was tested to measure the surface tension using a Fisher Scientific surface tension testing apparatus. A surface tension measurement was then taken on a mixture of 50% pinane and 50% PAO. The results indicated a 5% decrease in surface tension in the mixture versus the pure PAO. Based on this data, an invert 50% PAO, 50% pinane based mud with an 80:20 base/water ratio was formulated under laboratory conditions and tested for acceptability as a drilling fluid according to API standards and procedures. The results of these tests indicated the fluid was acceptable for use as a drilling fluid and was likely to exhibit high performance.

EXAMPLE 6

The same PAO base material and procedures in Example 5 were used except that 50% pinene, an unsaturated terpene, was substituted for the 50% pinane. The results were identical.

EXAMPLE 7

The same PAO base material and procedures in Examples 5 and 6 were used except that a terpene blend of 54% pinane and 46% pinene was substituted in lieu of 50% pinane or 50% pinene. The results were identical.

EXAMPLE 8

A sample of soya methyl ester was tested to determine surface tension using a surface tension testing apparatus from Fisher Scientific Company. A 10% addition of para-menthane, a saturated terpene, was added to the sample and the surface tension was measured again. The results indicated a 5% reduction in the surface tension of the ester-terpene mixture. Based on these results, an invert emulsion mud was formulated under laboratory conditions using the ester-terpene mixture as the external or continuous phase of the mud. The mud was then tested for acceptability as a drilling fluid according to API standards and procedures. The results of these tests indicated the fluid was acceptable for use as a drilling fluid and likely to exhibit high performance.

EXAMPLE 9

The same soya methyl ester base material and procedures in Example 8 were used except that 10% d-limonene, an unsaturated terpene, was substituted in lieu of 10% para-menthane. The results were identical.

EXAMPLE 10

The same soya methyl ester base material and procedures in Examples 8 and 9 were used except that a 10% by volume terpene blend comprising 54% pinane and 46% pinene was substituted in lieu of straight para-menthane or d-limonene. The results were identical.

EXAMPLE 11

A sample of dodecylbenzene, a linear alkylbenzene (LAB) and detergent alkylate from Vista Chemical Company, Baltimore, Md., was tested to measure surface tension using a Fisher Scientific surface tension testing apparatus. A batch of pinane equal to 10% by volume was added to the LAB and the surface tension was measured again. The results indicated a 9% reduction in surface tension. Based on these results, an invert emulsion mud with a base/water ratio of 80:20 was formulated under laboratory conditions using the LAB/pinane mixture as the external or continuous phase of the fluid. The mud was then tested for acceptability as a drilling fluid according to API standards and procedures. The results of these tests indicated the fluid was acceptable for use as a drilling fluid and was likely to exhibit high performance.

EXAMPLE 12

The same LAB base material and procedures in Example 11 were used except that pinene was substituted for pinane. The results were identical.

EXAMPLE 13

The same LAB base material and procedures in Examples 11 and 12 were used except that a 10% by volume terpene blend comprising 54% pinane and 46% pinene was substituted in lieu of straight pinene and pinane. The results were identical.

EXAMPLE 14

An invert emulsion mud was formulated under laboratory conditions using pinane, a saturated terpene, as the external or continuous phase of the fluid and calcium chloride water as the internal or discontinuous phase. The fluid formulation included an emulsifier, Alcomer 274 viscosifier, a gilsonite fluid loss control agent, barium sulfate weight material, and lime, all of which are commercially available and similar to those materials being used in oil based invert emulsion muds and synthetic based invert emulsion muds. The terpene based invert mud was then tested according to API standards and procedures. The results of these tests indicated the mud was acceptable as a drilling fluid and was likely to exhibit high performance. The fluid has characteristically low odor.

EXAMPLE 15

The procedures in Example 14 were repeated except that para-menthane was substituted for pinane. The results were identical.

EXAMPLE 16

The same procedures in Example 14 were repeated except that pinene was substituted for pinane. The results were identical except the drilling fluid had the characteristic strong odor of pinene.

EXAMPLE 17

The same procedures in Example 14 were repeated except that d-limonene was substituted for pinane. The results were identical except the drilling fluid had the characteristic strong orange peel odor of d-limonene.

EXAMPLE 18

The same procedures in Example 14 were repeated except that a blend of 54% pinane and 46% pinene was substituted for straight pinane. The results were identical except the drilling fluid had a stronger odor but not as strong as straight pinene.

EXAMPLE 19

An invert emulsion mud was formulated under laboratory conditions using a 50/50 blend of diesel and pinene as the external or continuous phase of the fluid and calcium chloride water as the internal or discontinuous phase of the drilling fluid. The drilling fluid formulation also included an emulsifier, a polymer viscosifier, a gilsonite fluid loss reducer, barium sulphate weight material and lime, all of which are commercially available and similar to those commonly being used to produce commercial oil based invert emulsion muds. The terpene/diesel based mud was then tested according to API standards and procedures. The results of these tests indicated that the mud was acceptable as a drilling fluid and was likely to exhibit high performance. The fluid had a strong pinene odor.

EXAMPLE 20

The same procedures as in example 19 were repeated except that pinane was substituted for pinene. The results were substantially identical except the drilling fluid had much lower odor.

The drilling fluid of this invention includes one or more unsaturated terpenes, one or more saturated terpenes, a mixture of hydrogenated terpenes or a mixture of hydrogenated and unhydrogenated terpenes. The unsaturated terpene may be monocyclic, preferably d-limonene, pinene, dipentene or mixtures thereof. These materials are readily commercially available. Other monocyclic unsaturated terpenes are also effective, such as p-cymene, 1,3-p-menthadiene, 2,4-p-menthadiene, 1(7),8-p-menthadiene, 2,8-p-menthadiene, 3,8-p-menthadiene and 1(7),2-p-menthadiene. The cyclic terpene may be bicyclic, such as pinene, 2-carene, 3-carene (also known as delta-3-carene) and 3(10)-carene.

The saturated terpenes may either be natural saturated terpenes or naturally unsaturated terpenes that have been artificially hydrogenated. Suitable saturated terpenes may be monocyclic such as p-Menthane and m-Menthane; bicyclic such as Pinane, Camphane, Carane and Thujane; acyclic such as Dimenthyloctane; or tricyclic such as Tricyclene and Cyclofenchene.

Because naturally occurring saturated terpenes are somewhat rare, the most economical approach is to hydrogenate commercially available unsaturated terpenes. Hydrogenation is an old and well known chemical reaction as pointed out in *Organic Chemistry*, Third Edition, pages 64–67. Thus, hydrogenating unsaturated terpenes is well within the ability of those skilled in the art.

The saturated terpene may be used in a substantial percentage of the additive in an amount sufficient to produce low odor, low toxicity synthetic based drilling fluids that pass toxicity and biodegradability tests. Thus, at least 30% by volume, preferably 50% by volume and up to 100% by volume saturated terpenes may be used. Although most of the balance of the additive is typically unsaturated terpene, other materials may also be employed, such as oils, dyes, fragrants if it is desired to mask the odor of fragrant terpenes or if a non-fragrant terpene is used, and the like. Of course, the terpene may be mixed with more-or-less neutral diluents or other materials, such as oils or other lubricants that do not substantially offset the advantages of the saturated or unsaturated terpenes.

Preferably, the additive of this invention is simply poured or injected into a more-or-less conventional oil or synthetic based drilling mud. When added to an OBM or SBM, the additive is present in an effective amount in the range of 1–15% by volume. The performance of the mud system is monitored to use the least amount of the additive commensurate with effectiveness. Usually, the amount of additive lies in the range of 1–10% by volume.

When the terpene is used as the continuous phase of the drilling fluid, water, an emulsifier, a viscosifier and weight material are added to create an inverted emulsion fluid in a conventional manner. The proportion of water can be varied, as in a conventional invert emulsion mud, but is typically in the range of 5–50% by volume and more normally in the range of 10–25%.

When an intermediate base drilling fluid is made, terpene is mixed with any suitable organic liquid base material, such as diesel oil, mineral oil, an ester, a mono-ether, di-ether or mixture thereof, poly-alpha-olefins or detergent alkylates. The terpene is mixed with the selected base material in 15–50% by volume. Conventional additives such as viscosifiers and weight material are mixed with the created base material in a normal manner to produce the desired drilling fluid. The intermediate base drilling fluid may be an invert emulsion mud in which water and an emulsifier are added.

I claim:

1. An inverted emulsion drilling fluid having a continuous phase comprising an organic liquid base and a discontinuous phase comprising water, an emulsifier, a weight material selected from the group consisting of barium sulfate and hematite, and a viscosifier selected from the group consisting of bentonite and synthetic polymer, the continuous phase comprising 1–100% terpene.

2. An inverted emulsion drilling fluid having a continuous phase comprising an organic liquid base selected from the group consisting of diesel oil, mineral oil, ester, poly-alpha-olefin, mono-ether, di-ether, linear alkyl benzene and mixtures thereof and a discontinuous phase comprising water, a weight material, an emulsifier and a viscosifier, the continuous phase comprises 1–15% terpene.

3. An inverted emulsion drilling fluid having a continuous phase comprising an organic liquid base and a discontinuous phase comprising water, a weight material, an emulsifier and a viscosifier, the continuous phase comprises 10–50% terpene.

4. The inverted emulsion drilling fluid of claim 3 wherein the liquid organic base is selected from the group consisting of diesel oil, mineral oil, ester, poly-alpha-olefin, mono-ether, di-ether, linear alkyl benzene and mixtures thereof.

5. The inverted emulsion drilling fluid of claim 1 wherein the continuous phase comprises 50–100% terpene.

6. An inverted emulsion drilling fluid comprising an organic liquid base comprising 50–99% by volume continuous liquid phase selected from the group consisting of diesel oil, mineral oil, ester, mono-ether, di-ether, poly-alpha-olefin, linear alkyl benzene and mixtures thereof, 1–50% by volume discontinuous water phase, an emulsifier, a weight material, a viscosifier and 1–15% by volume terpene.

7. The drilling fluid of claim 6 wherein the terpene is 30–100 parts by volume saturated terpene and 0–70 parts by volume unsaturated terpene.

8. The drilling fluid of claim 7 wherein the saturated terpene is selected from the group consisting of acyclic terpenes, monocyclic terpenes, bicyclic terpenes, tricyclic terpenes and mixtures thereof.

9. The drilling fluid of claim 7 wherein the saturated terpene is selected from a group consisting of Pinane, Menthane, Carane, Camphane, Thujane, Tricyclene, Cyclofenchene, Dimenthyloctane and mixtures thereof.

10. The drilling fluid of claim 7 wherein the unsaturated terpene is selected from a group consisting of monocyclic terpenes, bicyclic terpenes, tricyclic terpenes and mixtures thereof.

11. The drilling fluid of claim 6 wherein the terpene is unsaturated terpene.

12. The drilling fluid of claim 11 wherein the base is selected from the group consisting of diesel oil and mineral oil.

13. An inverted emulsion drilling fluid having a continuous phase of terpene, a discontinuous phase of water, an emulsifier, a weight material selected from the group consisting of barium sulfate and hematite and a viscosifier.

14. The inverted emulsion drilling fluid of claim 13 wherein the continuous phase is of the group consisting of unsaturated terpene, saturated terpene, and mixtures thereof.

15. An inverted emulsion drilling fluid having a continuous phase of terpene, a discontinuous phase of water, an emulsifier, a weight material and a viscosifier selected from the group consisting of bentonite and a synthetic polymer.

* * * * *